INVENTORS.
RICHARD AINSWORTH
WOLFGANG J. STEIN

United States Patent Office 3,398,605
Patented Aug. 27, 1968

3,398,605
METHOD OF OPERATING A TRANSMISSION FOR TRACKLAYING VEHICLES
Richard Ainsworth, Huntington, and Wolfgang J. Stein, Milford, Conn., assignors to Avco Corporation, Stratford, Conn., a corporation of Delaware
Filed Oct. 18, 1966, Ser. No. 587,569
9 Claims. (Cl. 74—720.5)

ABSTRACT OF THE DISCLOSURE

A transmission comprises two input power planetary gear sets for driving tracks of a tracklaying vehicle. Input power, supplied from a variable speed power source, such as a free power gas turbine, is connected to the tracks through the two planetary input gear sets by means of four gears, each of which provides a different drive ratio and is selectable by means of four clutches. Except during gear shifting operations, power is mechanically transmitted through one input planetary gear set and one selected gear. During gear shifting operations power is transferred from the one planetary gear set to the other by means of a hydraulic system consisting of two units operating alternately as a pump and a motor. The hydraulic system serves to selectively lock the reaction member of the one planetary gear set for 100% mechanical transmission and serves to variably control the reaction forces on the reaction member during the power transfer period. The system also includes two output planetary gear sets which are driven by the four selectable gears. For steering the vehicle, an additional hydraulic system, consisting of a pump and motor, is used for oppositely rotating the reaction members of the two output planetaries to change their relative speeds.

---

This invention relates to a transmission system for tracklaying vehicles, or the like, and to the method of operating same, the transmission system being particularly adapted for efficient operation with a variable speed power source.

The novel transmission of this invention is similar in its overall arrangement to that described in U.S. Patent No. 3,199,376 issued to G. M. De Lalio on Aug. 10, 1965, entitled, "Steering Transmission for Track Laying Vehicles." While the De Lalio transmission is arranged for operation with a constant speed power source, the present invention differs in that it is arranged for optimum performance with a variable speed power source.

As is known in the art, a free power gas turbine engine is capable of operation at high efficiency over a wide range of speeds. This transmission system takes advantage of such a variable speed characteristic. In the De Lalio transmission, a hydraulic power system is used for transferring power from one planetary gear set to a second set to change the driving ratio. Because De Lalio's input speed is maintained constant, power is transmitted through the hydraulics system throughout essentially the entire range of operation. In the present case, however, power is transmitted through the hydraulics only during the power transfer operations. It is well known in the art that hydraulic power circuits are much less efficient than mechanical gear trains, i.e., overall system efficiency is increased and the size and power requirements of the hydraulic units are reduced by not transmitting power through them, except for the short periods of time when the power is being transferred to another planetary gear set.

It is an object of the present invention to provide a transmission of the general type disclosed in the De Lalio patent, but with improved performance characteristics.

Another object of this invention is to provide a method for operating a transmission so as to produce improved efficiency, said transmission being operated in conjunction with a variable speed power source, such as a free power gas turbine engine.

A further object of this invention is to provide a method for operating a transmission including a pair of planetary gear sets in combination with a hydraulic drive which serves to transfer power from one planetary gear set to the other, the hydraulic drive being powered only during transfer operations.

Another object of this invention is to provide a transmission for a tracklaying vehicle having a variable speed power source, said transmission having at least two drive gears each having different gear ratios, and means for transferring power from one of said drive gears to the other and wherein the method of operating said transmission provides for the powering of said means only during the period of said transfer.

Another object of this invention is to provide a regenerative steering system for said tracklaying vehicle, said system permitting the vehicle to operate through a range from straight line motion to pivoting about the center of the vehicle.

Still another object of this invention is to provide a transmission which has full speed range capabilities in both a forward and reverse direction.

Still another object of this invention is to provide a power transferring system and method for a transmission having two planetary gear sets, the power transferring system providing the reaction force for the reaction member of each planetary set, and serving to transfer the power from one set to the other by varying said reaction force, no power being transmitted through said system except during periods of power transfer.

For further objects and advantages of this invention, reference should now be made to the following detailed specification and to the accompanying drawings in which.

Generally, this transmission comprises two input power planetary gear sets for driving tracks of a tracklaying vehicle. Input power, supplied from a variable speed power source, such as a free power gas turbine, is connected to the tracks through the two planetary input gear sets by means of four gears, each of which provides a different drive ratio and is selectable by means of four clutches. Except during gear shifting operations, power is mechanically transmitted through one input planetary gear set and one selected gear. During gear shifting operations power is transferred from the one planetary gear set to the other by means of a hydraulic system consisting of two units operating alternately as a pump and a motor. The hydraulic system serves to selectively lock the reaction member of the one planetary gear set for 100% mechanical transmission and serves to variably control the reaction forces on the reaction member during the power transfer period. The system also includes two output planetary gear sets which are driven by the four selectable gears. For steering the vehicle, an additional hydraulic system, consisting of a pump and motor, is used for oppositely rotating the reaction members of the two output planetaries to change their relative speeds.

Figure 1:
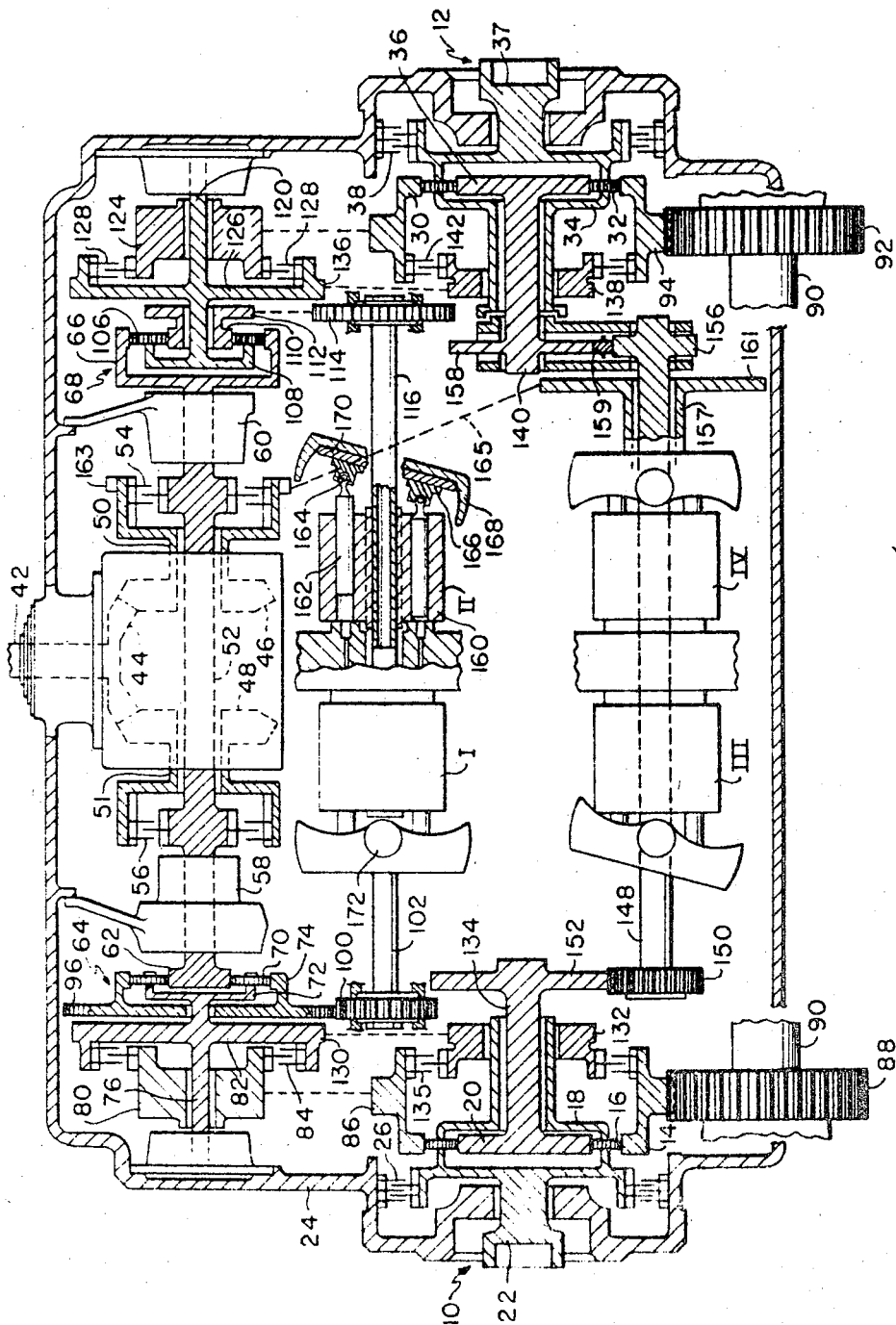
FIGURE 1 is a somewhat schematic sectional illustration of a preferred form of this invention
Figure 2:
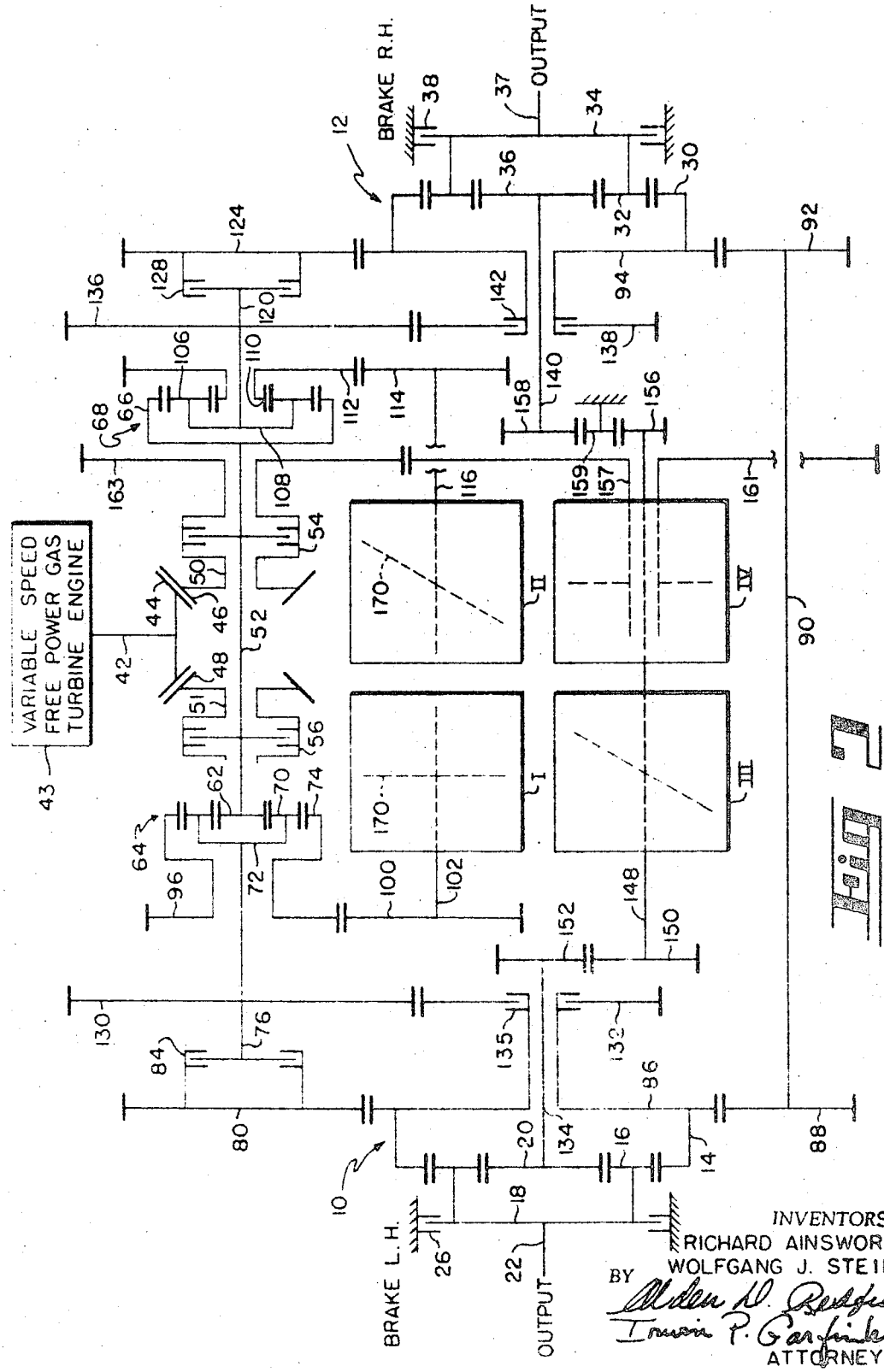
FIGURE 2 is a schematic representation of the apparatus of FIGURE 1.

In referring to the drawings, it should be borne in mind that FIGURE 1 is somewhat schematic in that the clutches, bearings, brakes, etc., have not been shown in detail and, further, in the fact that the cross section has been laid open to more vividly expose the various components, and, consequently, certain components are out of plane. While like reference characters designate corresponding parts in FIGURES 1 and 2, it should be borne in mind that FIGURE 2 is entirely schematic and many of the parts shown in FIGURE 1 are not included in FIGURE 2.

The transmission includes two output planetary gear sets, generally indicated at 10 and 12, respectively. The planetary gear set 10 includes a ring gear 14, planetary gears 16 rotatably supported on a carrier 18, and a sun gear 20. The carrier 18 drives an output shaft 22 which is rotatably supported within the housing 24. A conventional brake 26, having one portion fixed to the housing 24 and a second portion fixed to the shaft 22, provides braking for its associated vehicle track.

The second planetary set 12 is identically arranged, having a ring gear 30, planetary gears 32 rotatably supported in a carrier 34, and a sun gear 36. The carrier 34 drives an output shaft 37 which is rotatably supported in the housing 24. A brake 38, having one portion fixed to the housing and a second portion fixed to shaft 37, provides braking for its associated vehicle track.

In the arrangement of the planetary gear sets 10 and 12, as shown, the ring gears constitute the input or driving members for their respective sets, and the planetary gear carriers constitute the output or driven members, while the sun gear constitutes the reaction member. It will be understood that for a particular embodiment the various elements could be arranged so that any one could serve the function provided by any other.

Power for the transmission is supplied from a variable speed power source such as a free power gas turbine engine 43 (FIGURE 2) to an input shaft 42. An input bevel gear 44 fixed to the shaft 42 meshes with forward and reverse bevel gears 46 and 48 which are fixed to hollow rotatable shafts 50 and 51, respectively. The shafts 50 and 51 are rotatably supported from housing 24 and are selectively coupled to the drive shaft 52 by means of a forward clutch 54 or a reverse clutch 56. The drive shaft 52 is suitably supported in bearings 58 and 60 supported from the housing 24 and carries at its left end (as shown in the drawings) the input member, sun gear 62, of a planetary gear set 64, while on its right end it carries the input member, ring gear 66, of a planetary gear set 68. With the clutch 54 engaged and the clutch 56 disengaged, the drive shaft 52 rotates in a forward driving direction. With the clutch 56 engaged and the clutch 54 disengaged, the drive shaft 52 rotates in the reverse driving direction. It will be understood that for a particular embodiment the roles of the forward and reverse gears and clutches are interchangeable.

The planetary gear set 64 also includes planetary gears 70, rotatably supported on a carrier 72, and a reaction member, ring gear 74. The carrier shaft 76 is rotatably supported from housing 24. The carrier shaft 76 rotatably supports a first speed range gear 80 and fixedly carries a hub 82. For operation in a first speed range, a first speed range clutch 84, having portions fixed to the gear 80 and the hub 82, provides a driving connection between the carrier 72 and the gear 80. The gear 80 in turn meshes with the gear 86 on the outer periphery of ring gear 14 and, when rotated, serves to drive the output shaft 22 through the planetary gear set 10.

For driving the output shaft 37, the gear 86 also meshes with a gear 88 fixedly supported on the left end of a rotatably mounted cross-over shaft 90. The cross-over shaft 90 also carries at its right end a fixedly mounted gear 92 which drives the ring gear 30 of the planetary gear set 12 through a gear 94 on the outer periphery of the ring gear, thereby resulting in rotation of the output shaft 37.

A gear 96 fixed to the ring gear 74 of planetary gear set 64 meshes wth a gear 100 fixed to the rotatably supported input shaft 102 of a hydrostatic unit I, hereinafter to be described.

The planetary gear set 68 also includes planetary gears 106, rotatably supported on a carrier 108, and a reaction member, sun gear 110. A gear 112 fixed to the sun gear 110 meshes with a gear 114 fixed to a rotatably supported shaft 116 of a hydrostatic unit II, which is identical to the unit I.

The carrier shaft 120, rotatably supported from housing 24, rotatably supports a second speed range gear 124 and fixedly carries a hub 126. For driving in a second speed range, a second speed range clutch 128, having portions fixed to the second speed range gear 124 and the hub 126, provides a driving connection between the carrier 108 and the gear 124. The second speed range gear 124, in turn, meshes with the gear 94 on the outer periphery of ring gear 30 of the output planetary gear set 12 and, when rotated, serves to drive the output shaft 37 through the planetary gear set 12. For driving the output shaft 22, the gear 94, in turn, meshes with the gear 92 carried by the cross-over shaft 90 which serves to rotate the gear 88. Rotation of gear 88 causes the rotation of the ring gear 14 of the output planetary gear set 10 to rotate the output shaft 22.

The hub 82 carried by the carrier shaft 76 of the planetary gear set 64 carries a gear 130 which meshes with a third speed range gear 132 rotatably supported on the shaft of carrier 18 of planetary gear set 10. For operation in a third speed range, the ring gear 14 of the planetary gear set 10 is driven by the gears 130 and 132 through a third speed range clutch 135 having portions fixed to gears 132 and 14. Power is also transferred to the output shaft 37 through the cross-over shaft 90.

For operation in a fourth speed range, the hub 126 in the planeary gear set 68 similarly carries a gear 136 which meshes with a fourth speed range gear 138 rotatably supported on the shaft of carrier 34 of planetary gear set 12. Rotation of the gears 136 and 138 serves to drive the output shaft 37 through a fourth speed range clutch 142 having portions fixed to gears 138 and 30. As before, power is transferred to the output shaft 22 through the cross-over shaft 90.

For steering the vehicle, two additional hydrostatic units III and IV, both functionally identical to the units I and II, are provided. The shaft 148 of hydrostatic unit III extends through both units and carries a gear at each end. The gear 150 on one end meshes with gear 152 fixed on the shaft 134 of the sun gear 20. The other end of shaft 148 carries a gear 156 which drives a gear 158 fixed to the shaft 140 of the sun gear 36 through an idler gear 159. Because of the idler gear 159, rotation of shaft 148 causes rotation of the associated sun gears 20 and 36 in opposite directions so as to vary the effective gear ratios of the planetary gear sets 10 and 12 and hence vary the relative speeds of the output shafts 22 and 37, respectively, to effect steering of the vehicle. In addition, the idler gear 159 allows the torque reaction of planetary set 10 to be balanced against the torque reaction of planetary set 12 for normal straight forward or reverse operation. The hollow shaft 157 of hydrostatic unit IV, suitable supported from housing 24, carries a gear 161 and it is continuously driven by the engine 43 through a gear 163 fixed to the shaft 50 and other gearing (indicated only by a dotted line 165).

A complete description of a typical hydrostatic unit is included in U.S. Patent No. 3,212,358 issued to G. M. De Lalio on Oct. 19, 1965, and that description is incorporated by reference herein. While such a hydrostatic unit is suitable for the present application, it is to be understood that various other types of equipment may be substituted and may, in fact, be preferred. In the present construction the four hydrostatic units are identical, except for the arrangement of the shafts on units III and IV.

Briefly described, each hydrostatic unit comprises a drum 160 having a plurality of cylinders which slidably receive pistons 162 in a conventional manner. The end portion of each piston is provided with a ball joint 164 to which a slipper member 166 is pivoted. As its respective shaft rotates, the drum 160, pistons 162, and slipper members 166 rotate. Slipper members 166 bear against a thrust plate 168 supported within and fixed to a swash plate 170. The swash plate 170 is pivoted on trunions 172. As the drum and pistons turn, the slipper members 166 slide on the thrust plate 168, which causes the pistons 162 to move in and out of the respective drums 160 to displace fluid. As the swash plate angle is reduced, the piston stroke is also reduced, which also reduces the displacement per revolution of its shaft.

With the swash plate of one of the units at zero angle, its shaft is free to rotate. However, if the swash plate of the associated unit is at a maximum angle, its shaft will be locked. By simultaneously tilting the swash plates of associated units, the power transferred through the units, one acting as a pump and the other as a motor, can be varied from zero to a maximum.

Figure 3:
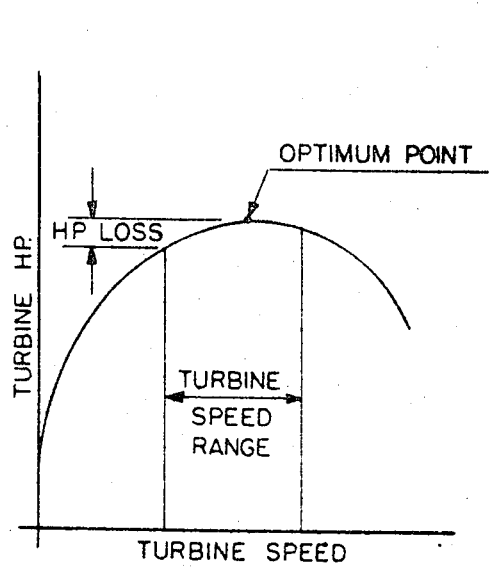
FIGURES 3 and 4 are curves showing the operating characteristics of a typical free power gas turbine for which the transmission is most suitable.

Before proceeding with a detailed explanation of the operation of the transmission, reference will now be made to the various curves of FIGURES 3–11. The curve of FIGURE 3 plots the operation of a typical free power gas turbine engine, such as that used with this transmission, and indicates a high engine efficiency over a wide speed range. This transmission has been designed for operation with such a power source, and cannot operate as efficiently with a constant speed power source such as that required in the aforementioned De Lalio patent.

Figure 4:
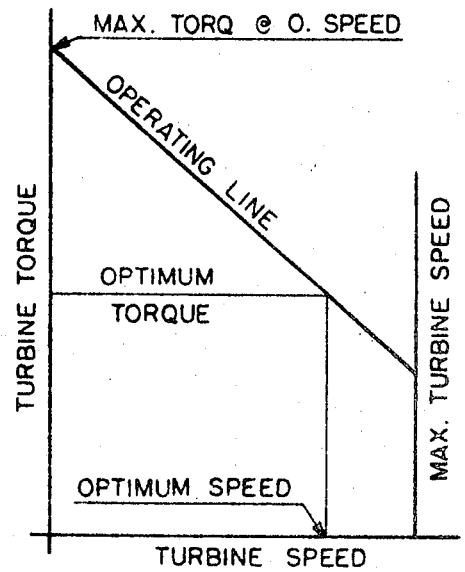

FIGURE 4 is the torque versus speed curve of a typical free power turbine. This curve shows that as the free power gas turbine engine speed decreases, available torque increases. This transmission takes advantage of this characteristic in that less gear steps are required to obtain a required tractive effort and overall output speed range.

Figure 5:
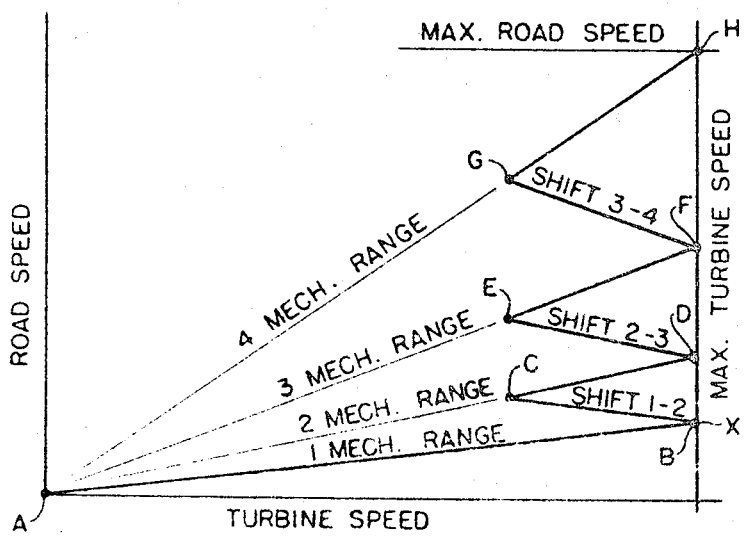
FIGURES 5, 6, 7, 8, 9, 10, and 11 are curves showing the operating characteristics of the transmission.

FIGURE 5 is a plot of the output shaft speed (road speed) of the transmission versus turbine speed. In the first range of operation (points A to B), the operation is through the mechanical gearing system. That is to say, output shaft speed is governed by the varying input speed of the power source. As the engine speed increases from zero to a given maximum, the output speed increases linearly, and during this portion of the operating range no power is transmitted through the hydraulics system. As the transmission is shifted from the first to the second speed range (B to C), the input speed is reduced, and the output speed increases as a portion of the power is transmitted through the hydraulics which serve to transfer power from one planetary gear set to the other. During the period from C to D power is again transmitted only through the mechanical gearing until maximum engine speed is reached. The steps are again repeated in shifting from the second to the third range (D to E to F) and from the third to the fourth range (F to G to H).

Figure 9:
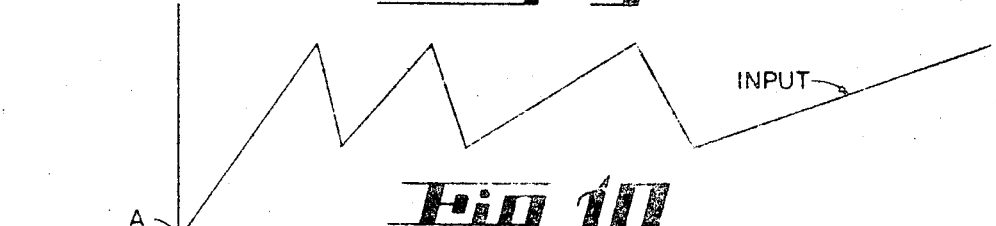

FIGURE 9 illustrates the percentage of power transmitted by the hydraulic units I and II over the operating speed range. From points A to B, C to D, E to F, and G to H there is no power transmitted through the hydraulic system. From points B to C, D to E, and F to G, a small portion of the total power is transmitted through the hydraulic system during the shifting operation from first mechanical speed range to the second, from second to third, and from third to fourth, respectively.

Figure 6:
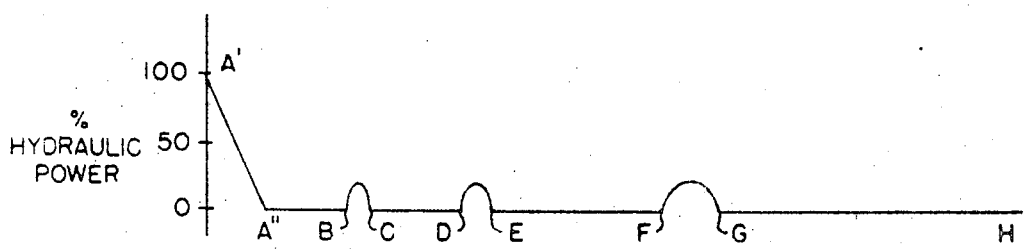

FIGURE 6 illustrates a modification of the invention which may be preferred. Since it may not be desirable to stop the free power turbine at zero road speed, the hydraulic units I and II can be brought to a neutral position by placing both swash plates to zero angle. This allows the free turbine to turn and thereby drives accessories or the like from this power source at zero vehicle speed. Curve portion A' to A" illustrates the power flow through the hydraulic system from idling speed to very low output speed.

Figure 7:
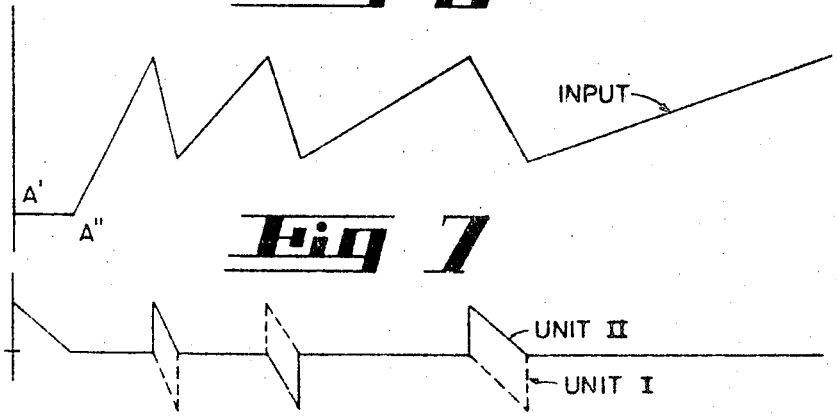
Figure 8:
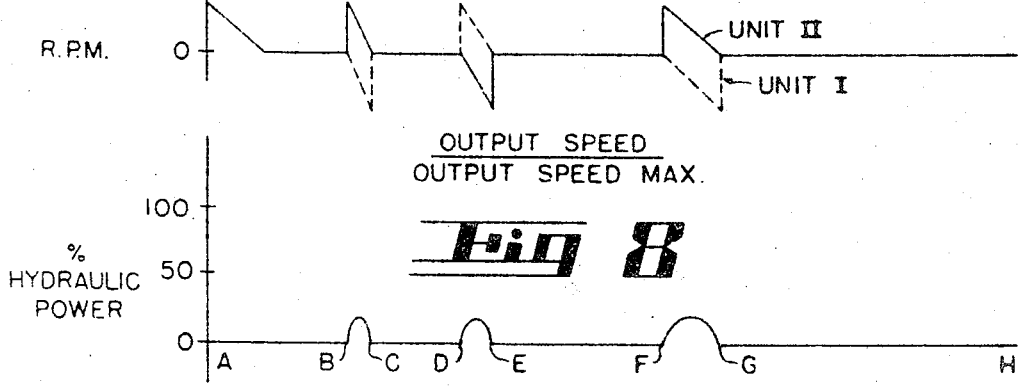
Figure 10:
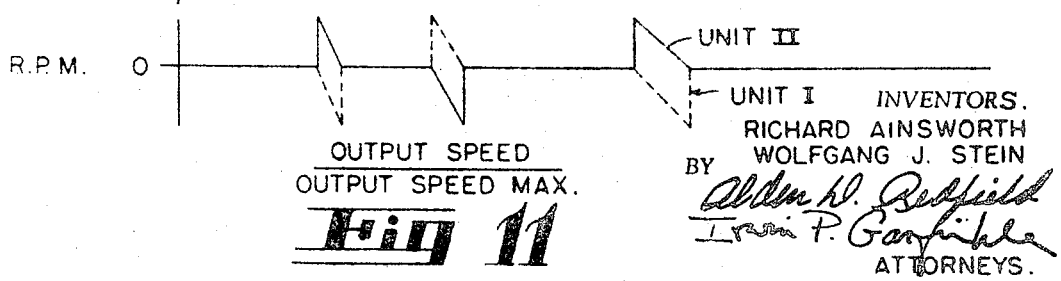
Figure 11:
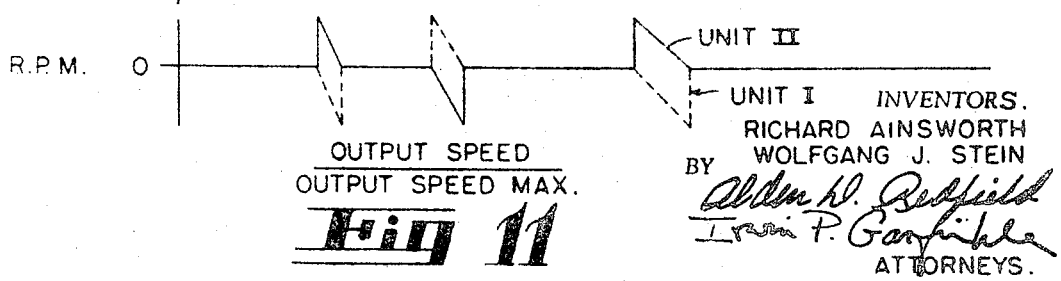

FIGURES 7 and 10 show the variations in input speed over the entire range of operation, while FIGURES 8 and 11 show the output speeds of the units I and II.

FIGURES 6, 7, 8, 9, 10, and 11 are all plotted against the same range of vehicle speeds, i.e., output speed of shafts 22 and 37.

In comparing the operating curves of this transmission (as illustrated in FIGURES 5–11) with that of the De Lalio transmission, it will be noted that De Lalio requires the transmission of power through the hydraulics throughout essentially the entire range of operation. It is only at certain instants that the power transmitted through the hydraulics of De Lalio's sysem is at zero. Thus, the present invention has the advantage of greater efficiency since there is a notoriously high power loss in the hydraulic mechanism. Furthermore, since the hydraulics of the present invention are used for only short times, the life requirements are much lower, and since the hydraulic speed range is inherently reduced, the hydraulic units can be made smaller.

The operation of the transmission will now be discussed in detail in connection with FIGURES 1 and 2 of the drawnigs. With the swash plate 170 of unit II at zero angle, and the swash plate of unit I at a maximum angle, the shaft 102 is locked and shaft 116 is free to rotate. When the positions of the swash plates are reversed to the position illustrated, i.e., when the swash plate of unit II is at a maximum angle, and the swash plate of unit I is at zero angle, the shaft 116 is locked and shaft 102 is free to rotate. With the swash plates tilted to an intermediate angle, both shafts are unlocked, one being operated as a pump and the other being operated as a fluid motor. When the swash plates are both at zero angle, the transmission is in neutral and shafts 102 and 116 are free to rotate.

Depending upon the desired direction of rotation, either the forward clutch 54 or the reverse clutch 56 is engaged. Assume that the forward clutch 54 has been engaged. To drive the vehicle in the first speed range, assume that the mode of operation illustrated in FIGURES 9, 10, and 11 as points A to B has been chosen. In this mode, the first speed range clutch 84 is engaged and other speed ranges 128, 135, and 142 are disengaged. Also, the swash plate of unit I is at maximum angle and the swash plate of unit II is at zero angle. This unlocks shaft 116, but locks shaft 102. This completes the connection from the engine through the input shaft 42 through the bevel gears 44 and 46, the forward clutch 54, and the shaft 52 to the sun gear 62 of the planetary gear set 64. Since the first speed range clutch 84 is engaged, the carrier 72 of the planetary at 64 is coupled to the planetary set 10 through the gears 80 and 86. Ring gear 74 of planetary set 64 is restrained by unit I through gears 96 and 100 and shaft 102. Since the swash plate of unit II is unrestrained, planetary gear set 68 has no reaction member and therefore can transmit no power. Also, turbine speed and output speed are zero.

At zero speed the maximum free power turbine torque is available (FIGURE 4) to drive the vehicle. It is readily apparent from FIGURE 4 that the free power turbine torque characteristic reduces the overall first speed range gear ratio to accommodate the maximum required tractive effort of the vehicle.

Engine speed and output speed are increased until point B is reached, and the transmission is ready to shift to second speed range.

The mode of operation illustrated in FIGURES 6, 7, and 8 as points A', A" and B where the engine speed is at a predetermined level at zero output speed is accomplished as follows. The hydraulic units I and II are at zero swash plate angle, first speed range clutch 84 and forward drive clutch 54 are engaged. Since both hydraulic units are at their neutral position, planetary gear set 64 and 68 have no reaction members and therefore no power is transmitted to the output shafts. The swash plate of unit I is now tilted toward a maximum, providing a reaction torque on planetary set 64 and driving unit I as a hydraulic pump. The hydraulic fluid is bypassed against a predetermined pressure valve until unit I is brought to zero speed. The output speed is increased through the first gear range system, as previously described, from points A' to A". At point A" unit I is at zero speed and point B is reached by increasing engine speed through the mechanical drive system. From points A' to A" power is dissipated in the hydraulic system as heat. Since the engine idling speed is less than optimum speed, more torque is available to start the vehicle (FIGURE 4) and therefore less overall gear ratio is required to accommodate the maximum vehicle tractive effort.

Still another modification of this invention is possible in the mode of operation from points A' to A". With both units I and II at zero angle, the first range clutch 84 and second range clutch 128 are engaged. By tilting the swash plates of unit I such that unit I becomes a pump, and tilting unit II swash plate such that unit II becomes a motor, hydraulic power can be recirculated through planetary sets 64 and 68 via shaft 52, thereby generating the torque necessary to rotate the output shafts through the first gear reduction system. As output speed increases, the amount of power transmitted through the hydraulic system decreases until point A" is reached. At this point, unit I is at maximum angle and unit II is at zero angle, and all power is transmitted mechanically through planetary gear set 64. From point A" to B engine speed and output speed are increased through the mechanical system.

To shift into the second speed range, the second speed range clutch 128 is also engaged. This now completes the coupling of the planetary gear set 68 to the planetary gear set 12 through the gears 124 and 94. At this time, however, all of the power to the output shafts 22 and 37 is still supplied from the planetary gear set 64 since the swash plate 170 of the unit II is free to rotate at zero angle, and therefore provides no reactive force on the sun gear 110 of planetary gear set 68. It will be noted, therefore, that the engagement of the second range speed clutch 128 has been made under no-load conditions since no torque is being transmitted through planetary gear set 68.

Next the swash plates 170 are tilted to their reverse positions, i.e., with the swash plate of unit II at maximum angle and the swash plate of unit I at zero angle. This tilting occurs from points B to C. At point C the swash plate of unit I is free to rotate, and therefore there is no reactive force on the ring gear of the planetary gear set 64, which therefore is now unloaded, and the first range speed clutch 84 may then be disengaged. It will also be noted that the swash plate of unit II is locked, therefore providing maximum reactive forces on the sun gear of planetary gear set 68 so that power is transferred at the highest effective gear ratio. To bring the vehicle up to maximum operating speed, the engine speed is again increased to its maximum operating level. The foregoing occurs from points C to D. Only during the period from points B to C, when the power is divided between the planetary gear sets 64 and 68, is some power being transmitted through the hydraulic units I and II.

The process is again generally repeated at point D to transfer the power back to the planetary gear set 64 for operation in the third speed range. For this purpose the third speed range clutch 135 is engaged while maintaining the second speed range clutch 128 engaged. With the swash plate of unit I at zero angle, unit I is brought up to maximum speed but provides no reactive force for the ring gear of the planetary gear set 64 so that power is still transferred to the output shafts through the planetary gear set 68. As the swash plates of the units are again reversed, power is divided between the planetary gear sets 64 and 68 until such time as the drive is entirely through the planetary gear set 64. This operation occurs between points D and E. At point E the second speed range clutch is disengaged. As before, the third speed range clutch 135 was engaged under no-load conditions and power was transmitted through the hydraulic units only during the power transfer operation. The vehicle is again brought up to maximum speed (point F) by increasing the engine speed.

At point F power is again transferred from the planetary gear set 64 to the planetary gear set 68 for operation in the fourth range. This is done by engaging the fourth speed range clutch 142 while maintaining the third speed range clutch 135 engaged. The swash plates of units I and II are again reversed so as to divide the power transmitted by the planetary gear sets 64 and 68 until such time as the swash plate of unit II is locked (at point G), and then all power is transmitted through the gear set 68. At point G, the third speed range clutch 135 is disengaged and the vehicle is brought up to maximum road speed by increasing the engine speed to its maximum operating level.

It will be noted that in the shifting from first to second, second to third, and third to fourth speed ranges, i.e., points B to C, D to E, and F to G, the input speed reduces while the road speed of the vehicle increases.

During the shift period when a portion of the power is transferred hydraulically, the overall system efficiency will decrease due to the inefficiency of the hydraulic system. During this period, the free power turbine will experience a change in kinetic energy. Since the turbine operates at a relatively high speed, the amount of kinetic energy change in the turbine will be quite large and, when considered over the relatively short period of time required to shift, will appear as an increase in available horsepower. This increase in power more than offsets the loss incurred by the hydraulic system and is a function of the time allotted to complete the shifting cycle. This is an inherent operating characteristic of the power source and the system utilizes this characteristic to achieve high efficiency over a relatively wide range of speeds.

The hydrostatic units III and IV are used for steering the vehicle. It will be noted that the shaft 157 of unit IV is continuously driven by the gears 163, 165, and 161. However, the swash plate of unit IV is ordinarily at a zero angle and hence transmits no power to the unit III, the swash plate of which is fixed at a maximum angle and thus locked. The sun gears 20 and 36 of planetary gear sets 10 and 12, respectively, are normally torque balanced through idler gear 159 and with the additional locking action of unit III, provide maximum reactive force for each set. When it is desired to steer the vehicle, the swash plate of unit IV is tilted, thereby permitting the unit IV to drive the unit III at a speed depending on the degree of tilt. Since the gear 150 of shaft 148 drives the sun gear 20 directly, while the gear 156 drives the sun gear 36 through an idler gear 159, the sun gears 20 and 36 are oppositely rotated and the effective gear ratio of one planetary gear set is increased while the other is decreased. Depending on the direction of the angle of tilt, the vehicle will turn to the left or right. The radius of the turn depends on the degree of tilt and the vehicle speed.

In summary, the transmission of this invention provides first and second input planetary gear sets through which power is selectively coupled to the output shafts. Except for the periods when the power drive is being transferred from one of the planetary gear sets to the other, all the power is transmitted through mechanical gearing. A hydraulic system is used for accomplishing the transfer. In transferring power from one gear set to the other, each of the clutches is engaged under no-load conditions, and power is then divided between the two sets until the transfer is accomplished. No power is supplied to the hydraulic system except during the transfer period. Steering is accomplished by oppositely varying the effective gear ratios of the output planetary gear sets.

While planetary gear sets are used in the illustrated embodiment, it will be understood that any other type of differential or variable ratio gearing arrangement may be used so long as it is provided with the required input, output, and reaction members so that the output speed can be varied with variation in the reactive forces. Furthermore, the particular hydraulic units may be of any known construction so long as they are capable of providing a variable reaction force to zero to a locked condition. While no automatic controls are shown for the engine, the hydraulic units or the clutches, and these may be manually controlled, it will be understood that speed and torque-sensitive devices may be incorporated and are preferred.

While not intending to limit the scope of the invention, the following gear ratios and output speeds are illustrative of a workable embodiment of this invention:

| Speed Range | Ratio | Maximum Output Speed (r.p.m.) |
|---|---|---|
| 1st | 1:53.4 | 535 |
| 2nd | 1:29.6 | 964 |
| 3rd | 1:16.5 | 1,735 |
| 4th | 1:9.125 | 3,120 |

While a four-speed transmission has been depicted, it will be understood that for the particular application any number of speed ranges may be used.

Various other modifications and adaptations will be readily apparent to persons skilled in the art, and it is intended, therefore, that this invention be limited only by the appended claims as interpreted in the light of the prior art.

What is claimed is:

1. In a transmission comprising first and second ratio controlled gear sets for transmitting power from a variable speed power source to a loaded output shaft, said second gear set having a higher maximum effective gear ratio than said first gear set; means for controlling the effective gear ratio of each of said sets; and means for selectively coupling each of said sets to said output shaft, said first set being initially coupled to said output shaft, said source operating at its optimum maximum speed, and said effective gear ratio of said first set being adjusted to a maximum while the effective gear ratio of said second set is adjusted to zero, the method of transferring power from said first gear set to said second gear set comprising the sequential steps of:
   (1) coupling said second set to said output shaft;
   (2) reducing the effective gear ratio of said first set to zero and simultaneously increasing the effective gear ratio of said second set to a maximum, the speed of said source decreasing as said ratios are changed;
   (3) decoupling said first gear set from said output shaft; and
   (4) increasing the speed of said source to its optimum maximum operating level.

2. The invention as defined in claim 1 wherein said gear sets are differentials, each having an input member, an output member, and a reaction member, and wherein the effective gear ratios of said sets are controlled by varying the forces applied to the reactive members of each of said differentials.

3. The invention as defined in claim 2 wherein said differentials are planetary gear sets.

4. In a transmission comprising first and second ratio controlled gear sets for transmitting power from a variable speed power source to a loaded output shaft, said second gear set having a higher maximum effective gear ratio than said first gear set; means for controlling the effective gear ratio of each of said sets; and means for selectively coupling each of said sets to said output shaft, the method of operating said transmission comprising the sequential steps of:
   (1) initially decoupling both of said sets from said output shaft;
   (2) reducing the effective gear ratio of said first set to zero and simultaneously increasing the effective gear ratio of said second set to a maximum;
   (3) coupling said first set to said output shaft;
   (4) increasing the effective gear ratio of said first set to a maximum and simultaneously decreasing the effective gear ratio of said second set to zero;
   (5) increasing said speed to its optimum maximum operating level;
   (6) coupling said second set to said output shaft;
   (7) increasing the effective gear ratio of said second set to a maximum and simultaneously decreasing the effective gear ratio of said first set to zero, the speed of said source decreasing as said ratios are changed;
   (8) decoupling said first gear set from said output shaft; and
   (9) increasing the speed of said source to its optimum maximum operating level.

5. The invention as defined in claim 6 wherein each of said gear sets is a differential having an input member, an output member, and a reaction member, the respective effective gear ratios of said sets being adjusted by varying the reactive forces on the respective reaction members.

6. The invention as defined in claim 5 wherein said differential is a planetary gear set.

7. In a transmission for transmitting power from a variable speed power source to a loaded output shaft, said transmission including first and second differential gear sets, said first set having first input, output, and reaction members, said second set having second input, output, and reaction members; and variable reaction means for applying a variable reaction force to each of said first and second reaction members, respectively, the method of operating said transmission comprising the steps of:
   (1) initially adjusting said variable reaction means for applying a zero reaction force to said first reaction member and a maximum reaction force to said second reaction member;
   (2) coupling said source to said output shaft through the input and output members of said first gear set when said first reaction member has a zero reaction force;
   (3) adjusting said variable reaction means to increase the reaction force on said first reaction member to a maximum and to decrease the reaction force on said second reaction member to zero;
   (4) increasing the speed of said power source to its maximum operating level;
   (5) coupling said source to said output shaft through the input and output members of said second gear set when said speed is at a maximum operating level;
   (6) simultaneously readjusting said variable reaction means to decrease to zero the reaction force applied to said first reaction member and to simultaneously increase to a maximum the reaction force applied to said second reaction member; and
   (7) thereafter decoupling said source from said output shaft through said first gear set.

8. The invention as defined in claim 7 wherein each of said differential gear sets is a planetary gear set.

9. In a transmission for transmitting power from a variable speed power source to a loaded output shaft, said transmission including first and second planetary gear sets, said first set having first input, output, and reaction members, said second set having second input, output, and reaction members; a hydraulic transmission including an input and an output, said input being connected to said first reaction member and said output being connected to said second reaction member, said hydraulic transmission being adjustable to oppositely vary the reactive forces on said first and second reaction members, respectively; first and second speed range gears; first and second selectively engageable clutches for coupling said source to said output shaft through the input and output members of said first and second planetary gear sets and said first and second speed range gears, respectively, the method of operating said transmission comprising the sequential steps of:
(1) adjusting said hydraulic transmission to apply a zero reaction force to said first reaction member and and a maximum reaction force to said second reaction member, respectively;
(2) engaging said first clutch when said hydraulic transmission is applying a zero reaction force to said first reaction member;
(3) adjusting said hydraulic transmission to simultaneously increase the reaction force on said first reaction member to a maximum and to decrease the reaction force on said second reaction member to zero, the speed of said engine decreasing as the reaction force on said first reaction member increases;
(4) increasing the speed of said power source to its maximum operating level;
(5) engaging said second clutch when said speed is at said maximum operating level;
(6) readjusting said hydraulic transmission to decrease to zero the reaction force on said first reaction member and to increase to a maximum the reaction force on said second reaction member; and
(7) disengaging said first clutch;

whereby power is transmitted through said hydraulic transmission only during the transfer of power from said first planetary gear set to said secondary planetary gear set, and whereby said first and second clutches are engaged and disengaged under no-load conditions, the power through said first and second planetary gear sets being divided during the period of transfer from one planetary gear set to the other.

References Cited

UNITED STATES PATENTS

| | | | |
|---|---|---|---|
| 2,757,513 | 8/1956 | Banker | 74—720.5 X |
| 2,808,737 | 10/1957 | Bullard | 74—720.5 X |
| 2,972,905 | 2/1961 | Bullard | 74—687 X |
| 3,204,486 | 9/1965 | De Lalio | 74—687 |
| 3,286,543 | 11/1966 | Porter | 74—687 X |

ARTHUR T. McKEON, *Primary Examiner.*